United States Patent [19]

Kallman

[11] E Re. 30,899

[45] Reissued Apr. 13, 1982

[54] ACCESSORY HOLDER FOR USE ON ARTICLE OF CLOTHING

[76] Inventor: Robert A. Kallman, 2030 Haring St., Brooklyn, N.Y. 11229

[21] Appl. No.: 946,097

[22] Filed: Sep. 26, 1978

Related U.S. Patent Documents

Reissue of:

[64] Patent No.: 4,055,873
Issued: Nov. 1, 1977
Appl. No.: 742,617
Filed: Nov. 17, 1976

U.S. Applications:

[63] Continuation-in-part of Ser. No. 690,262, May 26, 1976, Pat. No. 4,051,554.

[51] Int. Cl.[3] ..... A44B 21/00; A41D 1/00

[52] U.S. Cl. ..... 24/3 C; 2/94; 224/250

[58] Field of Search ..... 2/2, 94, 338, 246; 224/5 R; 24/3 C

[56] References Cited

U.S. PATENT DOCUMENTS

| | | | |
|---|---|---|---|
| 3,052,886 | 9/1962 | White | 2/2 |
| 3,543,977 | 12/1970 | Lockridge | 224/5 |
| 3,751,727 | 8/1973 | Shepard et al. | 2/2.1 A |

*Primary Examiner*—Doris L. Troutman
*Attorney, Agent, or Firm*—Darby & Darby

[57] ABSTRACT

An accessory holder, for use on an article of clothing such as ski jacket or the like *or other article*, comprising a flap having one end fixed to one attachment point [adjacent the junction of the arm and shoulder] of the article [of clothing] and adapted to fit around the accessory to be held, such as a foldable hat. The other end of the flap is detachably attached to another point [of attachment] on the [shoulder of the] article ]of clothing] to hold the accessory, with an intermediate piece provided on the underside of the flap adapted to hold the accessory and also to be attached to said other point of attachment.

17 Claims, 7 Drawing Figures

ACCESSORY HOLDER FOR USE ON ARTICLE OF CLOTHING

Matter enclosed in heavy brackets [ ] appears in the original patent but forms no part of this reissue specification; matter printed in italics indicates the additions made by reissue.

This application is a continuation-in-part of my prior copending application Ser. No. 690,262, filed on May 26, 1976, *now U.S. Pat. No. 4,051,554, granted Oct. 4, 1977.*

Many situations exist where a person engaged in a sports activity, for example, skiing, motorcycling or scuba diving, in which is desired to carry certain accessories, for example, a pair of ski goggles, a pair of gloves, mask, etc., while leaving the hands free. For example, in the case of ski goggles, when the skier is not using the goggles, he suspends them from around his neck by a strap. The same is true with the mask of a scuba diver. While the accessory can be carried this way when not in use, it is inconvenient and uncomfortable. Further, the accessory can be in the way of the user and also possibly be damaged.

The present invention relates to a novel arrangement for holding and carrying accessories of the foregoing type in a convenient way while leaving the hands of the user completely free. In the preferred embodiment of the invention, the accessory holding arrangement comprises a flap having one end fixed to one point on an article of clothing, for example, a ski jacket, wet suit, etc. The other end of the flap has fastening means which is adapted to be fastened between two alternative points on the clothing article. One of these points is an out-of-use position for the flap where it is stored and the second is a point of fixed, or semi-fixed, attachment such that the accessory to be held can be placed under the flap and the second end of the flap fastened to the second attachment point. In this position of the flap the accessory is securely held.

In the preferred embodiment of the invention, the fixed point of attachment for the first end of the flap is accomplished by sewing this end to the article of clothing. The two alternative points of attachment are provided by having one part of a piece of a fabric type fastener (e.g. VELCRO), such as the hook piece, on the second end of the flap. Two further pieces of the fabric fastener, such as the loop pieces, are fastened to the article of clothing at spaced points. The first is fastened at a point where the flap can be stored and the second is fastened at a point wherein the tab flap is attached in a manner to hold the accessory.

In the preferred embodiment of the invention, the fixed point of attachment for the first end of the flap is adjacent the shoulder of the jacket and the two alternative points of attachment for the other end of the flap are on the neck and the arm.

In a further embodiment of the invention a flap arrangement is provided to securely hold a relatively soft article, such as a hat, gloves, etc. Here, the flap has one end fixedly connected adjacent the juncture of the shoulder and the arm of the jacket. A piece of fabric fastener material provides the second point of attachment on the shoulder of the jacket adjacent to its collar. The underside of the flap has a piece of fabric fastener material complementary to the piece on the shoulder part of the piece on the underside of the flap is securely fastened while a further part extends free. The bit is placed between the underside of the flap and the extending free piece of fabric fastener material. The flap is then attached to the first piece of fabric fastener material by first making the attachment with the free part and then the fixed part of the second piece of material.

It is therefore an object of the invention to provide an accessory holder to be used on an article of clothing.

A further object is to provide a holder for accessory items which is fixed to an article of clothing so that the user can carry one or more accessories and still have his hands free.

An additional object is to provide a holder for accessories for use on an article of clothing in which the holder can be stored out of the way when not in use.

Yet another object is to provide an accessory holder for use on an article of clothing which comprises a flap having one end fixedly secured to the article and a second end which can be fastened at one or the other of two alternative points, the first point being one of storage for the flap and the second being one where the accessory is held.

Still another object is to provide an accesory holder for a soft object, such as a hat or gloves.

Other objects and advantages of the present invention will become more apparent upon reference to the following specification and annexed drawings, in which.

Figure 1:
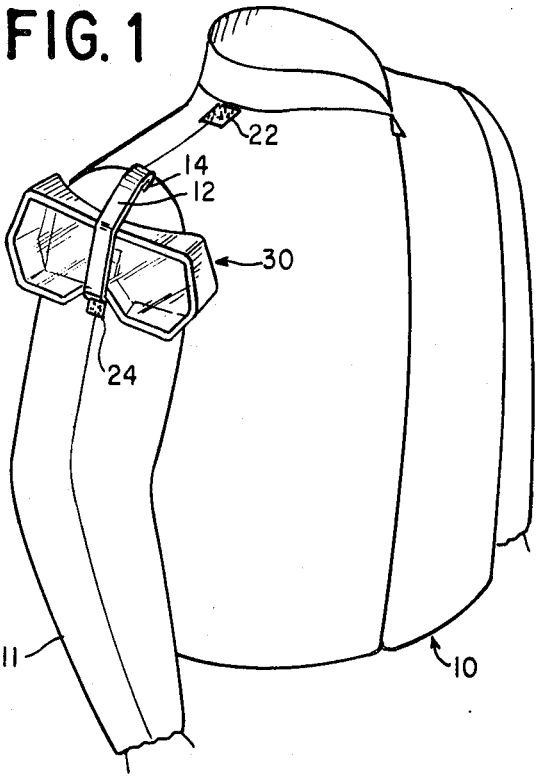
FIG. 1 is a diagrammatic view showing the accessory holder on an article of clothing in a use position.

Referring to the drawings, the article of clothing on which the accessory holder is to be used is shown generally as a jacket 10. This can be, for example, a ski jacket, wet suit, sweater, windbreaker, jump suit, coverall, motorcycle jacket, etc.

Figure 2:
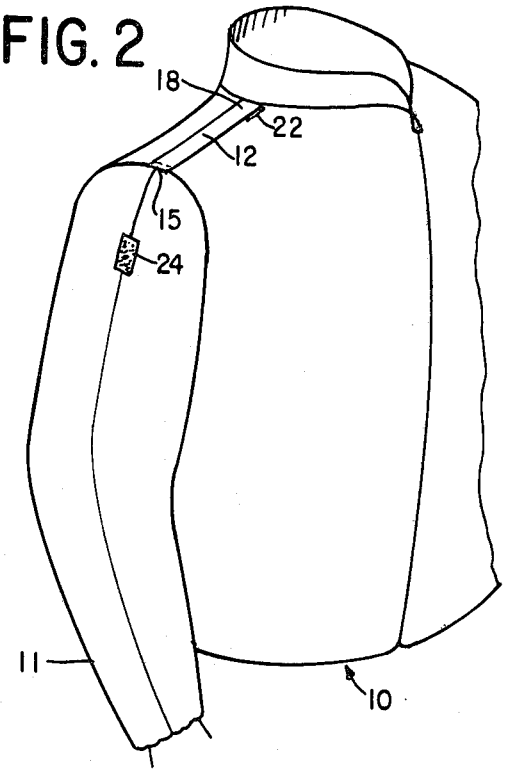
FIG. 2 is a view similar to the one in which the accessory holder is in a storage position.
Figure 4:
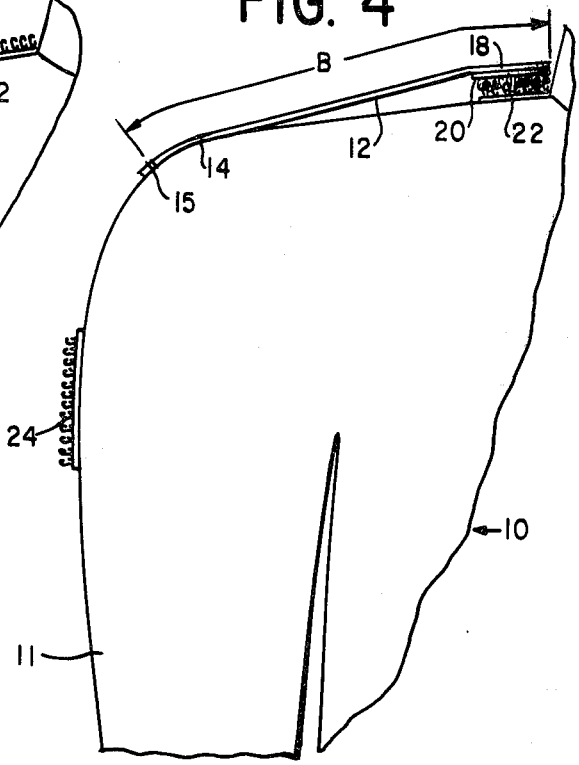
FIG. 4 is a side view of FIG. 2.

The accessory holder includes a flap 12 of a suitable strong material, for example, fabric, plastic, or other similar material. It can be of an inelastic or of an elastic material. Preferably, flap 12 is of a color which is coordinated, i.e., matching or contrasting, with the color of the clothing article 10. Flap 12 has one end 14 fixedly attached to the article of clothing. The fixed point of attachment is shown illustratively at the shoulder seams. The fixed point of attachment also can be at other places, for example, slightly below or above the shoulder seam. Of course, the point of attachment can be varied as desired. That is, it also could be at a midpoint on the arm so that the flap would at all times be on the arm. As shown in FIGS. 2 and 4, the end of the flap is sewn at 15 to the arm of the clothing article. The attachment of the flap end 14 to the sleeve 11 can be by any suitable means, for example, heat-sealing, adhesive, etc. The exact manner of attachment depends upon the various materials used for the article of clothing and the flap.

The second end 18 of flap 12 has a fastener 20 thereon which permits it to be alternately attached between two different locations on the article of clothing. As shown, the fastener 20 is a piece of one part of a fabric-type fastener 20, for example, the hook part of a piece of VELCRO material.

Two alternative fastening points are provided for the second end 18 of lap 12. In the preferred embodiment of the invention, these are also fabric-type fasteners, here the loop parts of VELCRO material. As shown in the drawings, the first of the two alternative fastening points, is a piece of the fabric fastener material 22 located adjacent the neck of the clothing article 10. The second point is an elongated strip of material 24 which extends substantially vertically along a part of the length of the arm 11 of the clothing article 10. Each of the pieces of the fabric fastener 20, 22 and 24 is attached by any suitable means, for example, sewing, adhesive, heat sealing, etc.

The accessory holder is used in the following manner. As shown in FIGS. 2 and 4, when the holder is not in use, the flap 12 has its second end 18 fastened to the first point of attachment. That is, fastener 20 on the second end of the flap is attached to the first point fastener 22 on the shoulder. When in this position, flap 12 is totally out of the way of the person wearing the clothing and it presents little or no wind resistance.

Figure 3:
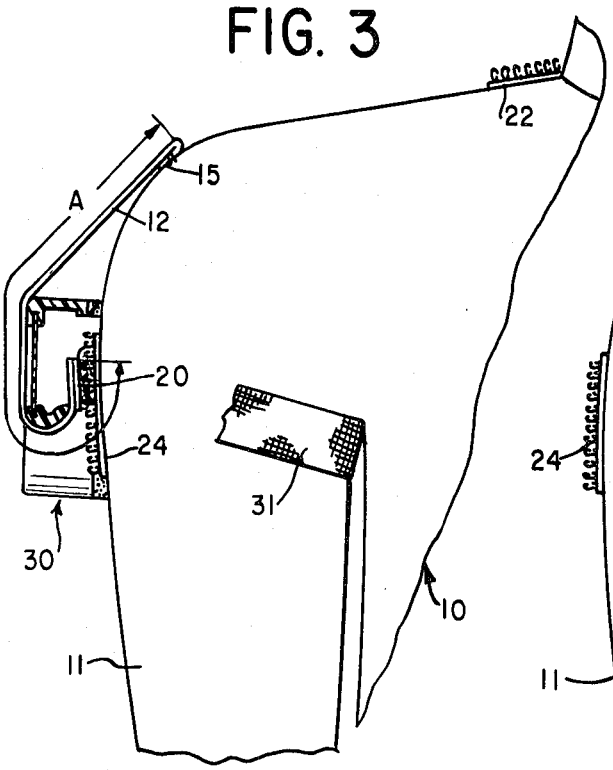
FIG. 3 is side view of FIG. 1 taken partly in cross-section.

When it is desired to hold an accessory, the fastener 20 on the second end 18 of the flap is removed from the shoulder fastener 22. The flap is then placed around the accessory to be held, here shown as a pair of ski goggles 30. The end 18 is then turned under so that the fastener 20 can be attached to the fastener 24 on the sleeve. Since the fastener 24 is elongated, the effective length of flap 12 can be changed to hold the accessory tightly and to accommodate different size articles. That is, a point of attachment can be made for the second end of the flap anywhere along the length of the fastener 24.

Where the flap 12 is made of an elastic material, an additional advantage is obtained in that it can be stretched when in the different positions. Thus, as shown in FIG. 4, flap 12 can be stretched to length B so that it will not flutter and offer little or no wind resistance. Length A in the use position shown in FIG. 3, can be different from length A.

The width of flap 12 also can be selected or desired. In the case of holding a pair of goggles, the flap bends around the nose bridge. This aids in more securely holding the goggles to the arm. Where the flap is made of elastic, this further increases the holding power.

It should be understood, of course, that other types of accessories can be held. For example, in the case of a scuba diver, mask, goggles, flippers, etc. In all cases, the accessory is securely held and the hands of the person are left free. Also, the accessory is stored out of the way.

Other types of fasteners also can be used in place of the fabric type. For example, snaps, buttons, hooks, etc. When these are used, the flaps also can be either of inelastic or elastic material. To vary the effective length of the flap in the use position, there can be a series of buttons or snaps on the arm.

Figure 5:
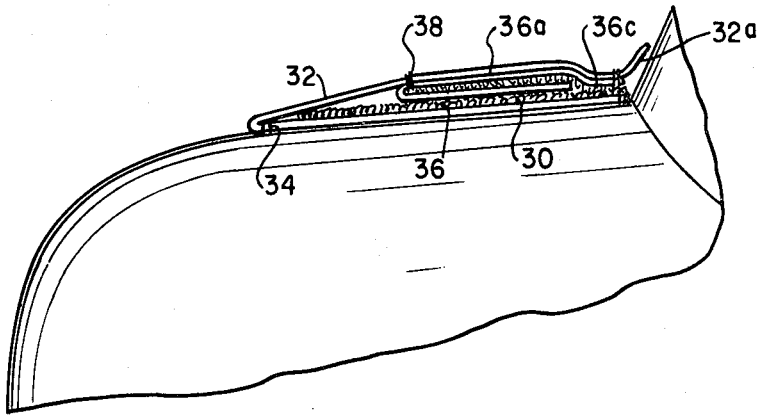
FIGS. 5, 6 and 7 are respectively diagrammatic views showing a further embodiment of the invention in the storage position, an intermediate position and the accessory holding position.
Figure 6:
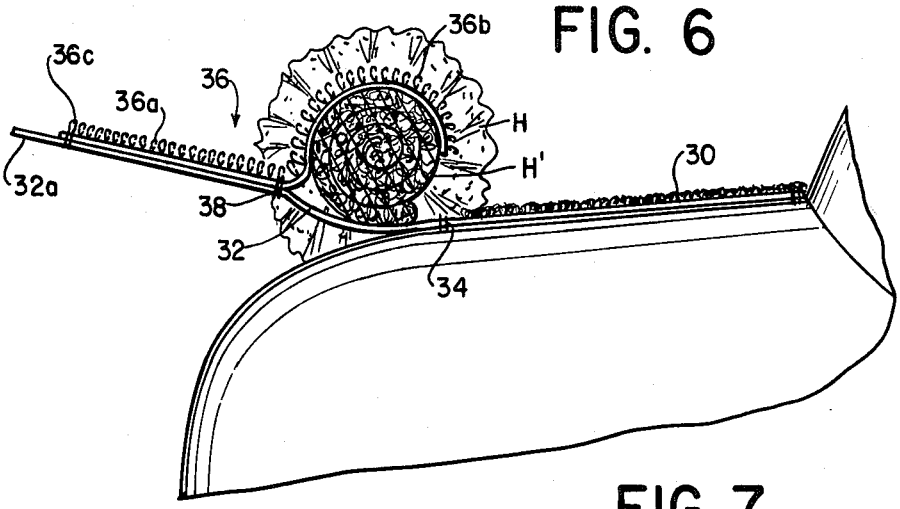
Figure 7:
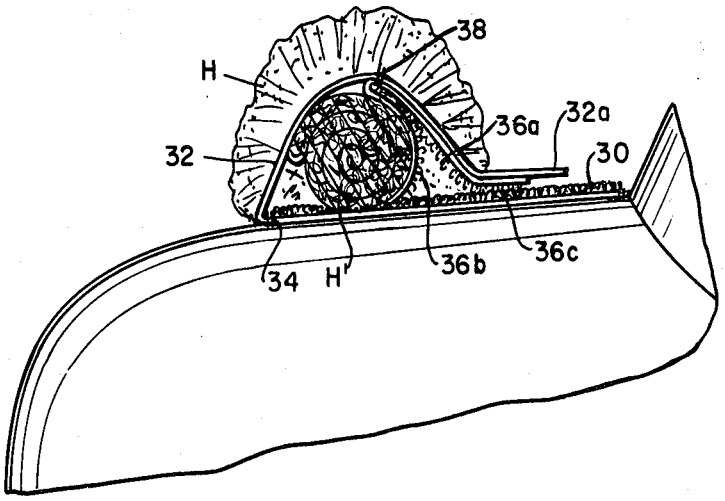

FIGS. 5, 6 and 7 show a further embodiment of the invention which is useful in securing equipment, for example, a hat H to the jacket or other soft material which can be rolled up, such as at H'. In these figures, a first fabric-fastening member 30, which, for example, is an elongated strip of VELCRO loop material, is fastened to the top of the shoulder portion of the garment. A flap 32 is attached to the shoulder portion of the garment, such as by sewing, at point 34.

On the underside of the flap, a complementary piece of fabric fastening material 36 is provided. The piece of material 36, being, for example, of VELCRO hooks, has one part 36a which is fastened to the under surface of the flap 32 at 38 and a second part 36b which is loose from flap 32. It is preferred that the free part 36b be slightly less in length than the fixed part 36a.

In the flap storage position, as shown in FIG. 5, the flap 32 is folded over so that the hook portions of 36a and 36b rest against the loop portion of the fabric fastening member 30 on the shoulder of the garment. Both parts 36a and 36b can be laid flat to engage member 30. However, as shown, even if 36b is not flat and it is folded over so that its hooks engage the hooks on the part 36a there will be some fastening action between the hooks and a fastening action when the flap 32a is folded over onto the shoulder in the area 36c of part 36a which will fasten on to the loop member 30.

To store an article such as hat H, the flap 32 is removed from the storage position on the shoulder shown in FIG. 5. For this purpose, the flap 32 has an end portion 32a which extends beyond the part 36a which is used to separate hook portion 36c from its associated loop area. The hat is then rolled into a generally cylindrical form and is placed beneath the free piece 36b. The piece 36b is then curled over somewhat around the hat and the flap 32 is then moved back onto the shoulder. A secure fastening occurs with the curled portion of piece 36b first coming into contact with fastening member 30. The entire flap is then pulled tight onto the shoulder and a substantial portion of piece 36a is brought into fastening contact with piece 30. In this manner, a tight fastening arrangement is provided.

What I claim is:

1. An accessory holder for an article of clothing comprising a flap member for covering a part of the clothing article, means for fixedly securing one end of said flap member at a first point on said article, a first elongated piece of fabric fastening material with fastening means thereon secured to the clothing article in at least a part of the area to be covered by the free part of the flap, a second piece of fabric fastening material with fastening means thereon on the underside of the flap having a first part secured to the underside of the flap and a second part hanging free, fastening means of both parts of said second piece of fabric fastening material facing the clothing article and engaging the fastening means on the first piece of fabric fastening material when the flap is laid down on the clothing article with the accessory being held located between the underside of the flap and second part of the second piece of fabric fastening material.

2. An accessory holder as in claim 1 wherein said article of clothing is for the upper body portion and includes a shoulder and an arm portion and a neck, said first point of attachment of the flap located adjacent the juncture of the shoulder and the arm of the clothing article and said first piece of fabric fastening material located on the shoulder adjacent to the neck of the clothing article.

3. An accessory holder as in claim 1 wherein said flap is of substantially inelastic material.

4. An accessory holder for an article comprising a first elongated piece of fabric fastening material with fastening means thereon adapted to be secured to the article with the fastening means facing away from the article, a flap having one end adapted to be fixedly secured to said article at a point adjacent a first end of said first elongated piece, a second piece of fabric fastening material with fastening means thereon on the underside of the flap, said second piece having a first part secured to the underside of the flap and a detached second part, the fastening means of both parts of said second piece of fabric fastening material facing the article and engaging the fastening means on the first piece of fabric fastening material when the flap is laid over said first piece of fabric fastening material and fastened thereto with the accessory being held between the underside of the flap and the detached second part of the second piece of fabric fastening material.

*5. An accessory holder for an article comprising a flap member for covering a part of the article, one end of said flap member adapted to be fixedly secured at a first point on said article, a free hanging piece attached to one side of the flap member, a first elongated piece of fabric fastening material with fastening means thereon adapted to be secured to the article in at least a part of the area to be covered by said flap, a piece of fabric fastening material with fastening means thereon on the underside of the said flap member between the point of attachment of said free hanging piece and the other end of said flap member and on a face of said free hanging piece, the fastening means of both pieces of fabric fastening material on said flap member and said free hanging piece facing and engaging the fastening means on the first piece of fabric fastening material when said flap member is laid down on the article with the accessory being held located between the underside of said flap member and said free hanging piece.*

*6. An accessory holder as in claim 5 wherein the second named piece of fabric fastening material has a first part on the flap and a free hanging second part which forms said free hanging piece.*

*7. An accessory holder as in claim 5 wherein the fastening means of the fabric fastening material of said second named piece of fabric fastening material is complementary to the fastening means of said first named piece of fabric fastening material.*

*8. An accessory holder for an article comprising a first elongated piece of fabric fastening material adapted to be secured to the article, a second elongated piece having one end adapted to be fixedly secured with respect to said article with the other end adapted to fold and unfold toward and away from a first end of said first elongated piece, one of said first and second elongated pieces having a free hanging piece with one end secured to the elongated piece, said one elongated piece having a first fabric fastening means thereon between the other end of said one elongated piece and the point of securement of said free hanging piece and on said free hanging piece, said other elongated piece having a second fabric fastening means thereon, said first and second fastening means facing each other and adapted to engage and hold when said first and second elongated pieces are overlaid and fastened to each other with the accessory being held at least in part between the underside of said free hanging piece and the part of said one elongated piece opposing the underside of said free hanging piece.*

*9. An accessory holder as in claim 8 wherein the second fabric fastening means has a first part on said first elongated piece and a free hanging second part which forms said free hanging piece.*

*10. An accessory holder as in claim 8 wherein said first and second fabric fastening means are complementary.*

*11. An accessory holder for an article of clothing comprising a flap member for covering a part of the clothing article, means for fixedly securing one end of said flap member at a first point on said article, a free hanging sub-flap attached to the side of the flap member normally facing the clothing part at an intermediate point, a first elongated piece of fabric fastening material with fastening means thereon secured to the clothing article in at least a part of the area to be covered by the flap, second and third pieces of fabric fastening material with fastening means thereon respectively secured on the underside of the flap between the point of attachment of the sub-flap, the fastening means of both said second and third pieces of fabric fastening material facing the clothing article and engaging the fastening means on the first piece of fabric fastening material when the flap is laid down on the clothing article with the accessory being held located between the underside of the flap and the sub-flap.*

*12. An accessory holder for an article comprising a first elongated piece of fabric fastening material with fastening means facing away from the article, a flap having one end adapted to be fixedly secured to said article with the other end adapted to fold and unfold toward and away for a first end of said first elongated piece, a sub-flap having one end secured to the underside of the flap at an intermediate point thereof, a second piece of fabric fastening material with fastening means thereon secured to the underside of the flap between the other end of the flap and the point of securement of the sub-flap, a third piece of fabric fastening material with fastening means thereon secured to the sub-flap, the fastening means of both said second and third pieces of fabric fastening material facing the article and adapted for engaging the fastening means on the first piece of fabric fastening material when the flap is laid over said first piece of fabric fastening material and fastened thereto with the accessory being held between the underside of the flap and the sub-flap.*

*13. An accessory holder as in claim 11 wherein said third piece of fabric fastening material forms said sub-flap.*

*14. An accessory holder as in claim 11 wherein the fastening means of the fabric fastening material of said second and third pieces is complementary to the fastening means of said first piece of fabric fastening material.*

*15. An accessory holder as in claim 12 wherein said third piece of fabric fastening material forms said sub-flap.*

*16. An accessory holder as in claim 12 wherein the fastening means of the fabric fastening material of said second and third pieces is complementary to the fastening means of said first piece of fabric fastening material.*

*17. An accessory holder for an article comprising a first piece of fabric fastening material having at least one end adapted to be fixedly secured to the article, a second elongated piece of fabric fastening material having one end adapted to be fixedly secured with respect to said article with the other end adapted to fold and unfold toward and away from said one end of said first piece, one of said first and second pieces having a free hanging piece secured thereto, a first fabric fastening means on said one piece and on the free hanging piece secured thereto, said other piece having a second fabric fastening means thereon, said first and second fabric fastening means facing each other and adapted to engage and hold when said first and second pieces are overlaid with the accessory being held at least in part by the underside of said free hanging piece.*

* * * * *